(12) United States Patent
Kasel

(10) Patent No.: US 10,713,886 B2
(45) Date of Patent: Jul. 14, 2020

(54) AMUSEMENT MACHINE

(71) Applicant: NOVOMATIC AG, Gumpoldskirchen (AT)

(72) Inventor: Dennis Kasel, Bingen am Rhein (DE)

(73) Assignee: NOVOMATIC AG, Gumpoldskirchen (AT)

( * ) Notice: Subject to any disclaimer, the term of this patent is extended or adjusted under 35 U.S.C. 154(b) by 0 days.

(21) Appl. No.: 16/119,957

(22) Filed: Aug. 31, 2018

(65) Prior Publication Data
US 2018/0374298 A1    Dec. 27, 2018

Related U.S. Application Data

(63) Continuation of application No. PCT/EP2017/054825, filed on Mar. 1, 2017.

(51) Int. Cl.
| | |
|---|---|
| *G07F 17/32* | (2006.01) |
| *H02J 50/10* | (2016.01) |
| *H04B 5/00* | (2006.01) |
| *H02J 7/02* | (2016.01) |

(52) U.S. Cl.
CPC ...... *G07F 17/3223* (2013.01); *G07F 17/3216* (2013.01); *G07F 17/3218* (2013.01); *G07F 17/3227* (2013.01); *H02J 7/025* (2013.01); *H02J 50/10* (2016.02); *H04B 5/0037* (2013.01); *G07F 17/3209* (2013.01); *G07F 17/3213* (2013.01)

(58) Field of Classification Search
CPC ............. G07F 17/3223; G07F 17/3216; G07F 17/3218; G07F 17/3227; G07F 17/3209; G07F 17/3213; H02J 50/10; H04B 5/0037
See application file for complete search history.

(56) References Cited

U.S. PATENT DOCUMENTS

| | | | |
|---|---|---|---|
| 2010/0069160 A1 | 3/2010 | Barrett | |
| 2012/0153894 A1* | 6/2012 | Widmer | H04B 5/0037 320/108 |
| 2013/0165208 A1* | 6/2013 | Nelson | G07F 17/3227 463/25 |
| 2016/0086145 A1* | 3/2016 | Tsutsui | G06Q 30/0201 463/25 |

FOREIGN PATENT DOCUMENTS

| | | |
|---|---|---|
| EP | 2608169 A1 | 6/2013 |
| WO | 2010020895 A2 | 2/2010 |

OTHER PUBLICATIONS

International Search Report dated Apr. 24, 2017 for PCT Application No. PCT/EP2017/054825.
International Search Report dated May 3, 2017 for PCT Application No. PCT/EP2017/054825.

* cited by examiner

*Primary Examiner* — Werner G Garner
(74) *Attorney, Agent, or Firm* — EIP US LLP

(57) ABSTRACT

An amusement machine comprising a computer-controlled game process control accommodated in a housing having a storage tray. A game process control-connected stationary unit for wireless energy transmission to an accumulator of a mobile computing unit is located below the surface of the storage tray, whereas the power supply of the unit is activated during standby mode of the game process control and/or for a computing unit located on top of the storage tray.

9 Claims, 3 Drawing Sheets

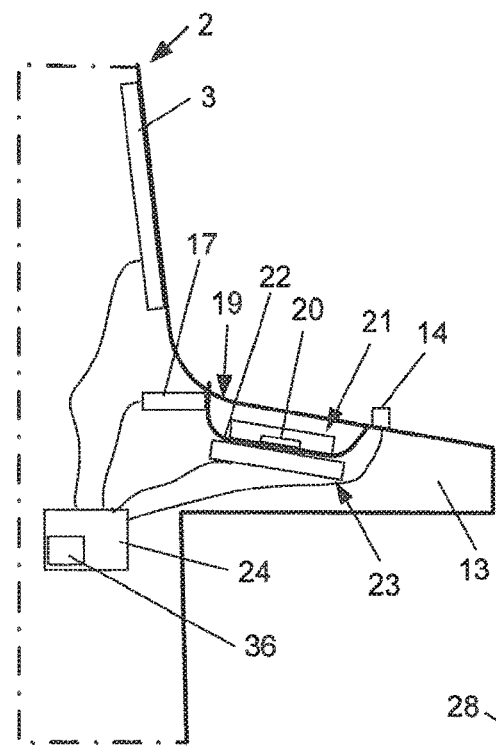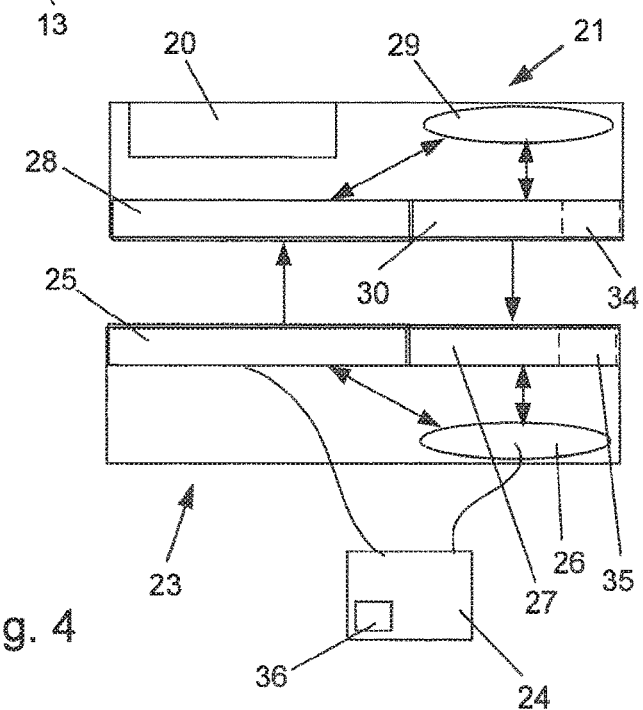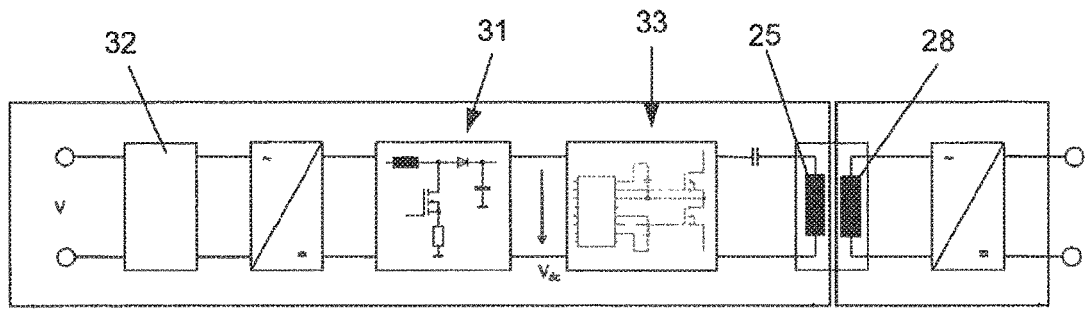

AMUSEMENT MACHINE

CROSS-REFERENCE TO RELATED APPLICATIONS

This application is a continuation of International Application No. PCT/EP2017/054825, filed Mar. 1, 2017, which claims priority to DE Application No. 10 2016103602.1, filed Mar. 1, 2016, under 35 U.S.C. § 119(a). Each of the above-referenced patent applications is incorporated by reference in its entirety.

BACKGROUND OF THE INVENTION

Field of the Invention

The application relates to an amusement machine with a computer-controlled game sequence control accommodated in a housing featuring a storage tray.

Description of the Related Technology

Amusement machines are often coin-operated and have many known embodiments. Such amusement machines often have one or several gaming units. They most frequently comprise a symbol gaming unit where rotatable units behind display windows show a combination of symbols indicating returns or losses. The symbol gaming unit may comprise drums and/or windows or may be displayed on a monitor, where necessary. Monetary and/or point and/or bonus game returns and the respective chances of winning or such, relative to a normal game, will be promised or presented.

The gaming units have symbols, which in certain combinations, e.g. on a prize scheme, are associated with returns in the form of money and/or points. Especially modern monitors can furthermore show background images and the gameplay is accompanied by music and/or special tone sequences, which is/are system-specifically stored in the amusement machine.

Player cards or such can be assigned to these amusement machines, with which players can log on to the amusement machines, for example, to enter certain preferences or perform age verification or the like.

SUMMARY

It is known from experience how to charge accumulators of mobile computing units, e.g. so-called smartphones or tablets, via induction technology. For allowing various mobile computing units using the same charging stations for wireless energy transmission via electromagnetic induction across short distance, the so-termed QI-standard was created. Such was most recently also integrated into furniture. The QI-standard uses a so-termed inductive coupling between a charging unit transmitter and a recipient of the mobile computing unit. In order to enable optimal energy transmission, the transmitter and recipient exchange data, whereas the transmitter modulates a transmission field and the receiver uses RFID-like technology for transmitting data to the transmitter.

The present disclosure includes one or more embodiments of an amusement machine of the above-mentioned type, which can be wirelessly connected with a mobile computing unit, in particular its accumulator.

An amusement machine comprises a computer-controlled game sequence control housed in a housing featuring a storage tray. A stationary unit for the wireless energy transmission to an accumulator of a mobile computing unit is arranged below the storage tray, whereas the power supply of the unit is activated during operational readiness of the game sequence control and/or for a computing unit situated on the storage tray.

As soon as the game sequence control is ready for operation, i.e. the amusement machine is ready to play, the user of the unit has the option to charge the accumulator of the mobile computing unit. This is alternatively or additionally accompanied by the query whether a chargeable computing unit is situated on the storage tray. This, in turn, will save energy, since it avoids unnecessary power supply of the unit with a non-existing or unsuitable or too distant computing unit.

The accumulator and/or computing unit are of course suitable for wireless charging. The stationary unit is also capable of determining the mobile charge status of the mobile computing unit's accumulator and, for example, set a charging voltage or a voltage for maintaining the charge level, especially for a fully charged accumulator. This contributes to saving energy and reduces the risk of damaging the accumulator due to excessive charging currents/voltages.

In order to charge accumulators with different outputs and/or different manufacturers without causing damage and in order to adjust the unit output to the accumulator to be charged, the stationary unit preferably disposes of an induction coil and a recognition unit for the power data of the accumulator. For adjusting the stationary unit to the accumulator to be charged and for achieving optimal energy transmission, the stationary unit and the accumulator and/or the receiver associated with the accumulator exchange data. Throughout, a transmitter of the stationary unit modulates the emission field and a recipient attributed to the accumulator uses RFID (radio frequency identification) technology (or similar) for transmitting data. Transmission takes for example place at frequencies between 110 kHz and 205 kHz. In order for the stationary unit transmitter's operating voltage to be compatible with frequently used charging units for 6-cell lithium-ion batteries, it preferably has 19 volts. The transmitted power is for example 5 watts or 120 watts.

Installing a transmission interference filter, e.g. a so-termed EMI filter, allows at a relatively low cost, the reduction of the conducted high frequency electromagnetic interferences that might affect the stationary unit.

For communication, in an embodiment the stationary unit comprises a recipient system for electromagnetic waves coupled with a processor, which adjusts the stationary unit for wireless energy transmission to an accumulator requiring charging. Expediently, the stationary unit comprises a reading unit connected to the processor and generating electromagnetic waves for communicating with a transponder attributable to the mobile computing unit. Data transmission occurs according to a standard similar to RFID or NFC (near-field communication).

Following further development, the storage tray is integrated into a money output tray and/or money insertion tray. The money output tray and/or money insertion tray generally feature a more or less horizontal surface whose size enables the safe placement of the mobile computing unit. In particular the money output tray and money insertion tray are integrated into a floor-mounted appliance of a panel at a distance from the controls and displays that users will generally need to operate. Furthermore, the amusement machine's interior has a relatively large hollow space where the installation of the wireless energy transmission unit does not cause interferences.

In order to avoid any damage to the computing unit situated on the storage tray caused by the output of coins, money output is preferably disabled on any money outputting storage tray on which a computing unit is placed.

For a system comprises a previously detailed amusement machine and a mobile computing unit with at least one transponder communicating with a recipient system of the stationary unit with a unique identification, a player profile stored in a memory unit of the game sequence control is activatable upon transponder recognition.

Accordingly, the user of the amusement machine may personalize the amusement machine by means of his mobile computing unit, which either comprises a transponder or is assigned a transponder. Communication takes place according to standards, such as RFID or NFC. The transponder and/or the identification of the mobile computing unit will be stored in an amusement machine memory and can be secured via an additional password or a biometric feature or such. Once the mobile computing unit has been recognized, certain customized settings are made, e.g. the most popular or selected games are offered to choose from, pre-set betting limits or maximum game durations are taken into account, etc. Of course, placing the mobile computing unit onto the stationary unit also charges or maintains the charge of the computing unit's accumulator.

In a further embodiment, the player profile comprises at least one count of a point bank and/or a credit display of the amusement machine, whereas the count can be stored when removing the mobile computing unit from a coverage area of the reading unit. Once users leave the amusement machine and take their mobile computing unit with them—which is usually the case—different states of the amusement machine can be stored in a manner as to be retrieved either automatically or when prompted following the next recognition of the computing unit inside the coverage area of the stationary unit.

Upon recognition of the mobile computing unit's transponder, data are expediently stored in a storage unit and/or data are read from the storage unit of the amusement machine or computing unit upon entering a respective command input into the amusement machine or computing unit.

Of course, the mobile computing unit may dispose of software enabling or facilitating operation in the connection with the amusement machine—or the amusement machine is equipped with particular software triggering the recognition of the mobile computing unit.

The context of the notions money or coins employed in the present description naturally comprises all payment alternatives, especially tokens, medals, vouchers, payment slips and such, without exiting the context of the present disclosure.

It goes without saying that the above and hereinafter to be explained features can be employed not only in the indicated combinations but also in other combinations. The scope of the present disclosure is solely defined by the claims.

BRIEF DESCRIPTION OF THE DRAWINGS

The methods and apparatus of the present disclosure will be further detailed below with reference to several embodiments and with reference to the accompanying drawings. It shows.

DETAILED DESCRIPTION OF CERTAIN INVENTIVE EMBODIMENTS

Figure 1:
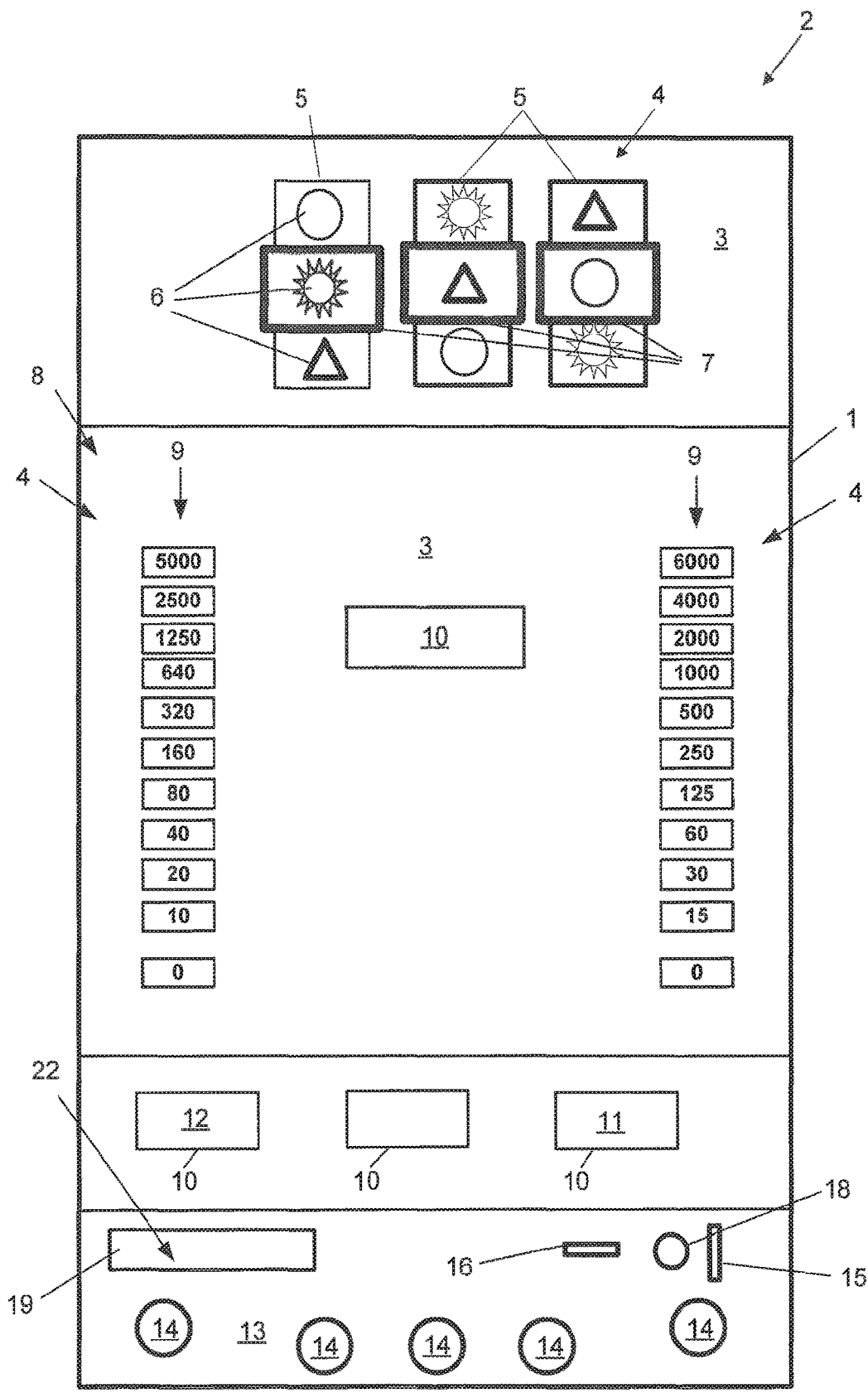
FIG. 1 a schematic frontal view of an amusement machine according to one or more embodiments, FIG. 2 a schematic frontal view of the amusement machine according to FIG. 1 in an embodiment, FIG. 3 a schematic cross-section of a partial illustration of the amusement machine according to FIG. 2, FIG. 4 a simplified schematic illustration of a detail according to FIG. 3, FIG. 5 a schematic partial illustration of detail according to FIG. 3.

A housing 1 of a money-operated, computer-controlled amusement machine 2 with profit opportunity, suitable for frame or wall suspension, frontally features two vertically arranged monitors 3 serving to display gaming units 4 and/or information, especially game-relevant information, such as a prize schedule. By way of example one of the gaming units 4 is displayed as a symbolic gaming unit with three juxtaposed arranged rotatable bodies 5. A game process control 24 creates a computer-generated image corresponding to the active rotatable bodies 5 with circumferential symbols 6. Furthermore, computer-generated display windows 7 are presented on monitor 3 that serve to display a randomized game result, i.e. of a certain combination of symbols 6. The display of a game result is accompanied by the display of the virtual rotatable bodies 5 corresponding to stopped wheels. From the displayed symbols 6, the user can see the game result and especially also whether there is a win according to the displayable prize schedule.

Monitor 2 in the middle of amusement machine 2 is shown as touchscreen 8 as an example and serves to display gaming unit 4 shown as risk ladders 9. Any win can for example be transferred as stake for purposes of continued playing to one of the two risk ladders 9.

In this case, a display 10 is provided between the two risk ladders 9 which, for example, is part of a jackpot unit known to the expert and serves to display points which are achieved as a function of a certain game result.

A section of the amusement machine 1 below monitors 3 features additional displays 10 for credit, points, wins and such, whereas one of the displays 10 represents a point bank 11. In case of a credit in a display 10 shown as credit display 12, a certain monetary amount is transformed from the credit display 12 into a certain number of points, then added to the point bank 11 from which a certain amount of points is debited as stake for a game in gaming unit 4 and to which the points won in gaming unit 4 are added. During a payout of a monetary value, the point value count of the point bank 11 is first converted into a credit to be displayed in credit display 12 during a preset time cycle.

In a lower housing section 13 of the amusement machine 2, post-start/stop buttons are arranged as push buttons 14 in the present embodiment. By acting on it, the symbol 6 of the attributed rotatable body 5 of gaming unit 4 can optionally be post-started and/or prematurely halted, i.e. the display is manipulated in a way as to display rotatable body 5 as idle or rotating. Furthermore, a coin insertion slot 15 and a banknote insertion slot 16 of a money-processing unit 17, not shown, are provided. A return button 18 is furthermore arranged next to coin insertion slot 15, whose activation can retrieve in money output tray 19 a credit shown in credit display 12.

The money-processing unit 17 may have a coin processing unit and/or a banknote processing unit, which may be structurally separated from each other and/or may be arranged at a distance.

Figure 2:
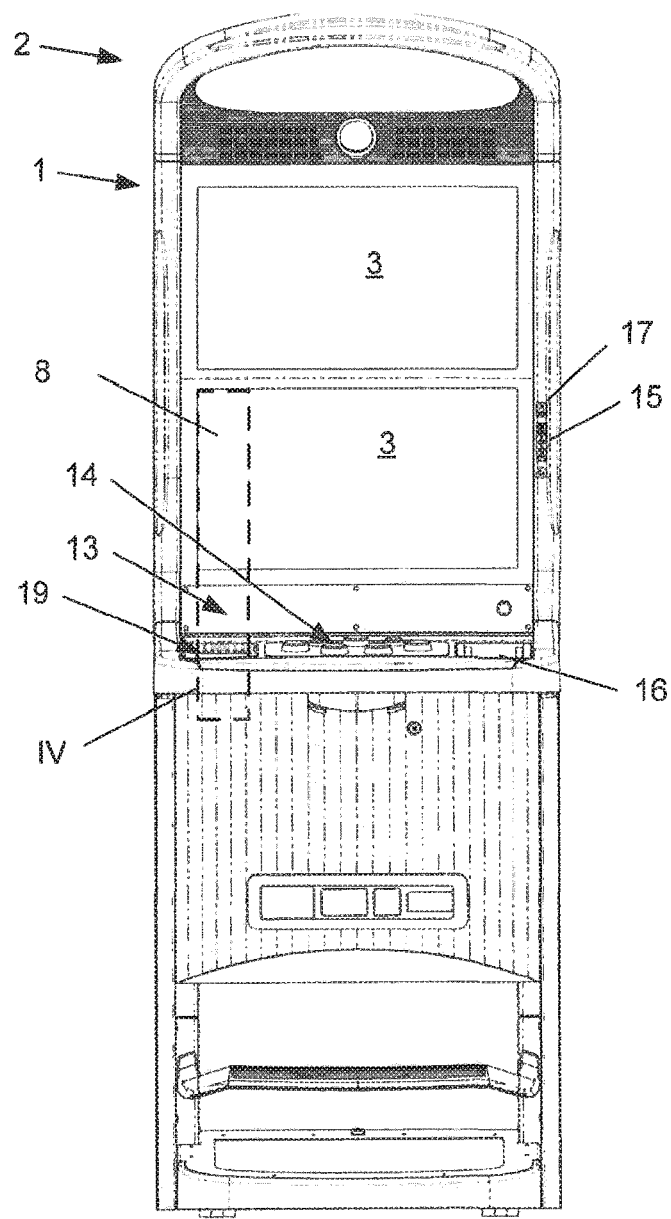

A money insertion tray can preferably be situated in front of the banknote processing unit and/or the banknote input slot 16 (FIG. 2). Such a money insertion tray has a support surface for placing a banknote whose support surface can be bordered on both sides by positioning edges for aligning the banknotes transversely to the direction of insertion and centered relative to the money input slot 16 and/or to a predetermined lead edge. The support surface may be designed as an integrated part of the housing section in the manner of a panel. The support surface is preferably designed as a horizontal surface whose dimensions will also enable the safe placement of the mobile computing unit, i.e. constituting a safe storage area for the mobile computing unit.

Money insertion tray 16 may have a mouthpiece working in conjunction with the money-processing unit. Such mouthpieces facilitate in particular the exact positioning of the banknotes to be inserted.

In a particular embodiment, the mouthpiece may be executed separately from the money processing unit, whereas the mouthpiece can in particular be mounted to and/or integrated into a movable housing part so that the mouthpiece can be removed by moving away the housing part from the money-processing unit; the money processing unit preferably being mounted within the device housing. The mouthpiece can in particular be mounted to a swivel-mounted door or desk so that by swiveling open the door, the mouthpiece can be removed from the money-processing unit and, by swiveling the door shut, it can be placed exactly in front of the money-processing unit. At the same time, the money insertion tray and/or the storage tray for the mobile computing unit may be an integral part of the swivel-mounted door or desk, thus enabling co-movement along the door and/or desk. Swiveling is possible either along a horizontal or vertical axis, depending on the requirements or conditions.

An alternative embodiment of the freestanding housing 1 of amusement machine 2 comprises two stacked monitors 3, whose upper monitor 3 serves to display game-related information, while the lower monitor displays a gaming unit. In lower housing section 13 below the lower monitor 2, which is designed as touchscreen 8, push buttons 14, displays 10 and the money output tray 19 are arranged, among others. This housing section 19 projects in the manner of a panel from the amusement game front in direction of the user operating station.

In order to enable a user of the amusement machine 2 to charge at said amusement machine 2 an accumulator 20 of the mobile computing unit 21, which is designed in particular in the form of a so-termed smartphone or phablet, without requiring a connection cable and a corresponding cable interface, a stationary unit 23 for wireless energy transmission via induction to the respectively designed accumulator 20 of the mobile computing unit 21 is installed in money output tray 19 that serves as storage tray 22. Here, computing unit 21 is situated in money output tray 19 and unit 23 is situated invisible beneath the storage tray 22 of the money output tray 19 for the user.

Unit 23 for wireless energy transmission is coupled to game process control 24 in such a manner that the power supply of unit 23 is activated when the game process control 24 is ready for operation and/or when the computing unit 21 situated on the storage tray 22. Unit 23 for wireless energy transmission is configured in accordance with the QI-standard in a manner as to allow detecting various accumulators 20 as well as the states of charge so that damage to accumulators 20 can be avoided by switching to a charging mode or a charge maintenance mode or by switching off the power supply.

Such a unit 23 for wireless energy transmission essentially comprises a sending coil 25, which is coupled to a voltage source, for example, with the interposition of the game process control 24 and a computer-controlled first monitoring unit 26, which communicates with the sending coil 25 and a first communication unit 27 of the stationary unit 23.

Accumulator 20 of the mobile computing unit 21 is connected to a receiver coil 28, which communicates with a second monitoring unit 29, whereas the second monitoring unit 29 is connected to a second communication unit 30.

The first monitoring unit 26 and the second monitoring unit 29 naturally comprise respective processors and memories or are coupled to them when the respective components of the game process control 24 or computing unit 21 are utilizable.

According to FIG. 5, different mains voltages, for example between 100 V and 240 V, preferably between 90 V and 264 V are automatically detected and regulated during a first stage 31 of the stationary unit 23. First stage 31 may for example be designed as an active or passive power factor correction filter (PFC) with an upstream EMI radio interference filter 32.

During a second stage 32, also referred to as resonance stage, the power transformation is being conducted for covering the power range of 0.1 to 100 watts, thus allowing charging the various accumulators 21.

In order to allow data transmission in addition to wireless energy transmission, a second high-frequency magnetic field is being switched on and off in the simplest of cases, corresponding to an amplitude modulation. This induces electric voltage inside the coil, which a diode rectifies. Signal transmission thus occurs into both directions.

If the second communication unit 30 for example comprises a transponder 34 or the like for the clear identification of computing unit 21, which is possibly equipped with respective software, computing unit 21 may communicate with a receiver system 35 designed as a reading device or comprising a reading device for transponder data of the first communication unit 27 of stationary unit 23 and in addition to the exchange of data concerning accumulator information, it can also communicate with game process control 24 in such a manner that a player profile stored in a storage unit 36 of game process control 24 is activated, whereas the player profile comprises at least one count of a point bank 11 and/or a credit display 12 of the amusement machine 2. Storing respective data in storage unit 36 of amusement machine 2 and/or selecting data from storage unit 36 of the amusement machine 2 occurs following a respective command input to the amusement machine 2 or computing unit 21, e.g. by activating a respective command key.

It is also possible that upon recognition of computing unit 21 situated on storage tray 22 in money output tray 19, game process control 24 obtains the information from the first monitoring unit 26 that it chooses money processing unit 17 in such a manner that no money is issued while releasing money issuance into money output tray 19 upon removal of computing unit 21 from storage tray 22.

What is claimed is:

1. An amusement machine with a computer-controlled game process control, which is accommodated in a housing having a storage tray, characterized in that below the surface of the storage tray, a stationary unit is linked to the computer-controlled game process control for wireless energy transmission to an accumulator of a mobile computing unit, whereas a power supply of the mobile computing unit is activated during readiness for operation of the game process control and/or the mobile computing unit located on the storage tray, and wherein the storage tray is integrated into a money output tray, and in the case of the mobile computing unit situated on top of the storage tray of the money output tray, the money output tray is deactivated.

2. The amusement machine according to claim 1, characterized in that the stationary unit comprises an induction coil and a recognition unit for accumulator power data.

3. The amusement machine according to claim 1, characterized in that the stationary unit comprises a receiver system for electromagnetic waves, which is coupled to a processor adjusting the stationary unit for the wireless energy transmission to the accumulator requiring charging.

4. The amusement machine according to claim 1, characterized in that the stationary unit comprises a radio interference filter.

5. The amusement machine according to claim 4, wherein a receiver system is adapted for communication with a transponder attributable to the mobile computing unit.

6. The amusement machine according to claim 5, whereas a player profile stored in a storage unit of the game process control can be activated via the stationary unit upon transponder recognition.

7. The amusement machine according to claim 6, characterized in that the player profile comprises at least one count of a point bank and/or a credit display of the amusement machine, whereas the at least one count can be stored when removing the mobile computing unit from a coverage area of the receiver system.

8. The amusement machine according to claim 6, characterized in that upon transponder recognition, first data will be stored in a storage unit and/or second data will be retrieved from the storage unit of the amusement machine or the mobile computing unit via a receptive command input to the amusement machine or the mobile computing unit.

9. The amusement machine according to claim 1, wherein the storage tray is integrated into a money insertion tray.

* * * * *